V. BANG.
BEET HARVESTING MACHINE.
APPLICATION FILED APR. 8, 1912.
1,059,589.
Patented Apr. 22, 1913.
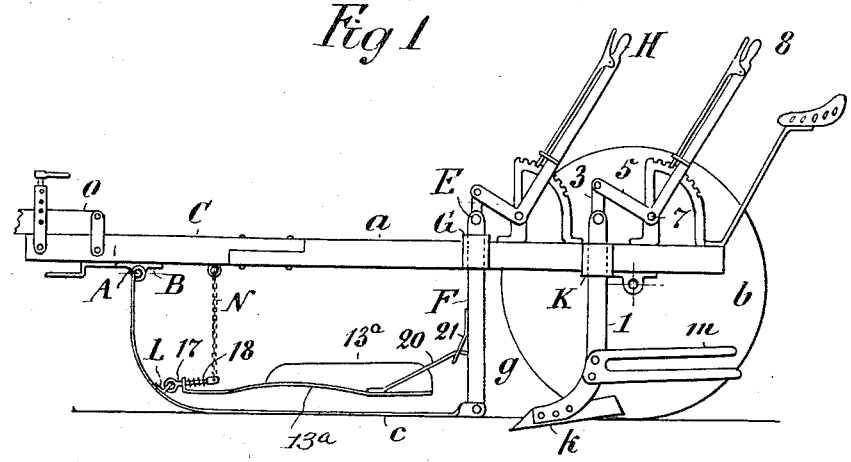
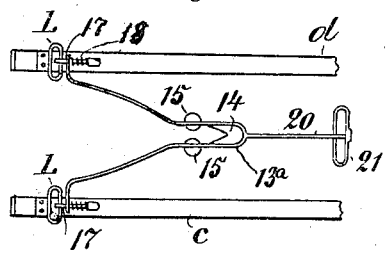
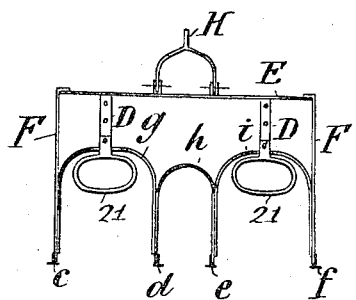
Witnesses
E. J. McGee.
William E. Tucker.
Inventor
Vilhelm Bang
By Emil Baimelyke
Attorney

UNITED STATES PATENT OFFICE.

VILHELM BANG, OF NYKÖBING, DENMARK.

BEET-HARVESTING MACHINE.

1,059,589.  Specification of Letters Patent.  Patented Apr. 22, 1913.

Application filed April 8, 1912. Serial No. 689,372.

*To all whom it may concern:*

Be it known that I, VILHELM BANG, director, a subject of the Kingdom of Denmark, residing at the city of Nyköbing, Jutland, Denmark, have invented certain new and useful Improvements in Beet-Harvesting Machines; and I do hereby declare the following to be a full, clear, and exact description of the invention, such as will enable others skilled in the art to which it appertains to make and use the same.

The invention has for its object improvements in beet harvesting-machines provided with top cutters movably mounted in sleigh-runners, the rear ends of which can be vertically adjusted by means of a handle. In the known machines of this kind the harvest-irons are fixed to the rear part of the sleigh-runners in such a manner, that they are moved up and down with said sleigh-runners. But in accordance with the invention the harvest-irons are fixed to vertical arms arranged behind the sleigh-runners, which arms can be moved up and down by means of a special handle, so that the harvest-irons can be vertically adjusted independently of the sleigh-runners. By this arrangement it is possible to prevent the sleigh-runners with the top cutters being pressed toward the soil, as they can be lowered or lifted to correspond with the soil independently of the harvest-irons, and further by individual adjustment of the harvest-irons the driver can cut, loosen and collect the beets as desired in the different depths of the ground.

Further the invention has for its object to improve the connection between the front-ends of the sleigh-runners and the draw-bar or the frame of the machine, and also to improve the connection between the front-ends of the top-cutters and the sleigh-runners in such a manner, that said front-ends obtain a certain lateral play, so that the top-cutters can better catch the beet-tops even if the beets stand uneven.

Further the invention has for its object an improved top-cutter which in front of the usual angular cutter is provided with two other cutters arranged opposite to each other, which cutters cut off the outermost blades or leaves of the beets, so that the blades are cut off by three cuts, which process of course facilitates the work which must be done by the usual angular cutter.

A constructional form of the invention is illustrated on the drawing.

Figure 1 is a side-view of the machine, one of the wheels and parts unnecessary for the description of the invention being omitted. Fig. 2 is a plan of one of the top-cutters and its sleigh-runners, the guide-plate of the top cutters being omitted. Fig. 3 is a detail view of the connection between the rear-ends of the sleigh-runners and their adjusting handle, showing the disposition of the supporting arches.

The machine comprises a frame $a$ made of U-iron or the like and carried by an axle provided with two wheels $b$, and four sleigh-runners $c$, $d$, $e$, $f$ connected together by means of arches $g$, $h$, $i$ and carrying movably arranged top-cutters. Behind the top-cutters are arranged harvest-irons $k$, which cut off the ends of the beets and pluck up the beets, which then by means of collecting bars $m$ arranged behind the harvest-irons are collected in a single row behind the machine.

The sleigh-runners $c$, $d$, $e$, $f$ are of flat steel. Their front ends are turned up and provided with eyes journaled upon a shaft A which can rotate in a bearing B fixed to the innermost part C of the draw-bar, which part is fixed to the frame $a$ and connected to the draw-bar $o$, which can be adjusted to conform with the height of the horses or other draft-animals.

The rear ends of the sleigh-runners are connected together by means of the arches $g$, $h$ and $i$. The arches $g$ and $i$ are by means of bars D connected to a bar E, which is connected to a handle H near the driver's seat, so that the rear-ends of the sleigh-runners are lifted or lowered when the handle is moved. During the vertical adjustment the sleigh-runners are guided by means of guide-bars F fixed to the outer sides of the arches $g$ and $i$ and sliding in guides G to the frame $a$.

Each harvest-iron $k$ is fixed to an arm 1, which can be moved up and down in guides K fixed to the frame $a$. By means of links 3 the arms 1 are connected to cranks 5 on a shaft 7 carrying a handle 8, so that by means of said handle the harvest-irons can be vertically adjusted independently of the sleigh-runners.

The top-cutting mechanism consists, as usual, of a bifurcated frame 13$^a$, to the rear-part of which is fixed an angular cutter 14. To the frame 13ᵃ is further fixed a guide plate 13, which is located above said frame 13ᵃ and is shaped to guide the severed beet-tops toward the sides of the machine. The rear part of the cutter-frame 13ᵃ is loosely suspended in an elongated loop 21, adjustably fixed to the frame, a hook 20 carried by said frame 13ᵃ being engaged with said loop 21 so as to have a certain amount of lateral play. In accordance with the invention two cutters 15 are arranged opposite to each other in front of the cutter 14 (Fig. 2) and have their bearings in the frame 13ᵃ. Said cutters 15, which preferably are rotary disk cutters, cut off the larger exterior leaves or blades of the beets, so that the tops are cut off by three cuts, which of course facilitates the work which must be done by the cutter 14.

The front ends of the arms of the cutter-frame are provided with eyelets which are inserted on pins 17, the eye-shaped forward ends of which are, in turn, inserted on elongated transversely disposed loops L fixed to the sleigh-runners so that a certain lateral play is permitted the front end of said frame 13ᵃ. The rear ends of the pins 17 are by means of a chain N or the like suspended from the frame a, and said pins 17 carry springs 18 which bear between nuts or similar abutments on the rear ends of said pins 17 and the front ends of said frame 13ᵃ strung on said pins, thereby forcing the front-ends of the blade-cutters forward.

By means of the described arrangement the lateral play of the front-part of the cutter-frame, and consequently the cutters is greater and freer than otherwise, and of course the cutter frame can better catch the beet blades even if the beets stand uneven.

Having thus described my invention, what I claim is:—

1. In a beet harvesting machine, the combination, of a frame, a movably arranged top-cutting mechanism, sleigh-runners carrying said top-cutting mechanism and having their front ends turned up and fixed to a shaft, a bearing for said shaft fixed to said frame and means for vertically adjusting the rear ends of said sleigh-runners.

2. In a beet harvesting machine, the combination, of a frame, sleigh-runners carried by said frame, means for vertical adjustment of the rear ends of said sleigh runners, a top-cutting mechanism carried by said sleigh-runners, and a suspending means for said top-cutting mechanism comprising elongated loops carried by said runners and hooks on said top-cutting mechanism engaging said loops.

3. In a beet harvesting machine, the combination, of a frame, sleigh-runners carried by said frame, means for vertical adjustment of said sleigh-runners, a top-cutting mechanism carried by said sleigh-runners, consisting of a cutter-frame, cutters for trimming the sides of the tops and a cutter for finally severing the tops and a suspending means between the sleigh-runners and said top-cutting mechanism whereby the latter is flexibly mounted and laterally adjustable.

4. In a beet harvesting mechanism, the combination, of a frame carrying adjustable harvest-irons, a plurality of sleigh-runners mounted in front of said harvest-irons, means for vertically adjusting the rear ends of said sleigh-runners, a top-cutting mechanism carried by said sleigh-runners, and means for allowing longitudinal and lateral movement of said cutting mechanism on said sleigh-runners.

In testimony whereof, I affix my signature, in presence of two witnesses.

VILH. BANG.

Witnesses:
C. CLEITH,
CHAS. HORTENSE.